Figure 1:
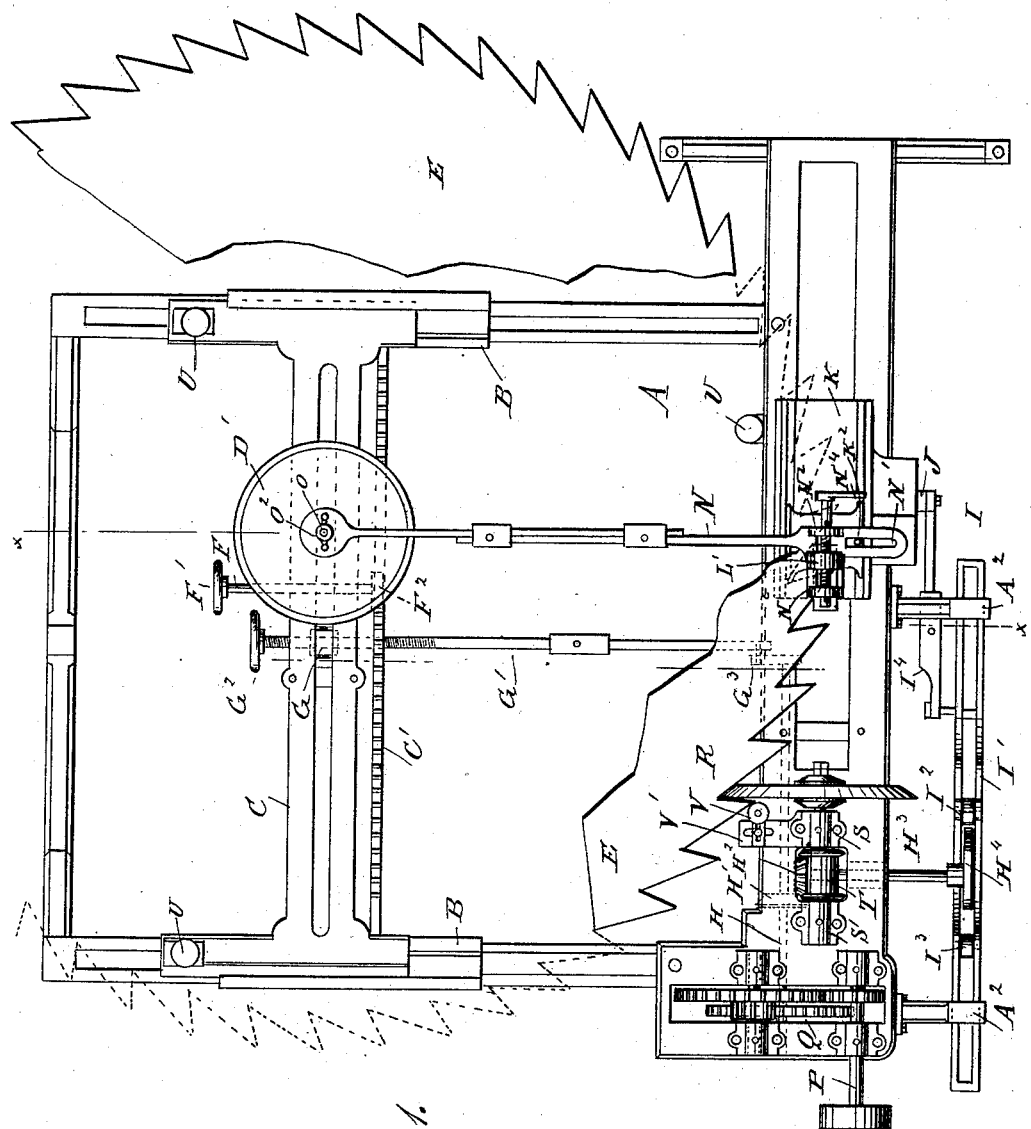

(No Model.) 4 Sheets—Sheet 1.
R. GASKIN.
ROTARY SAW SHARPENER.

No. 360,679. Patented Apr. 5, 1887.

WITNESSES:
Chas. Nida
C. Sedgwick

INVENTOR:
R. Gaskin
BY Munn & Co.
ATTORNEYS.

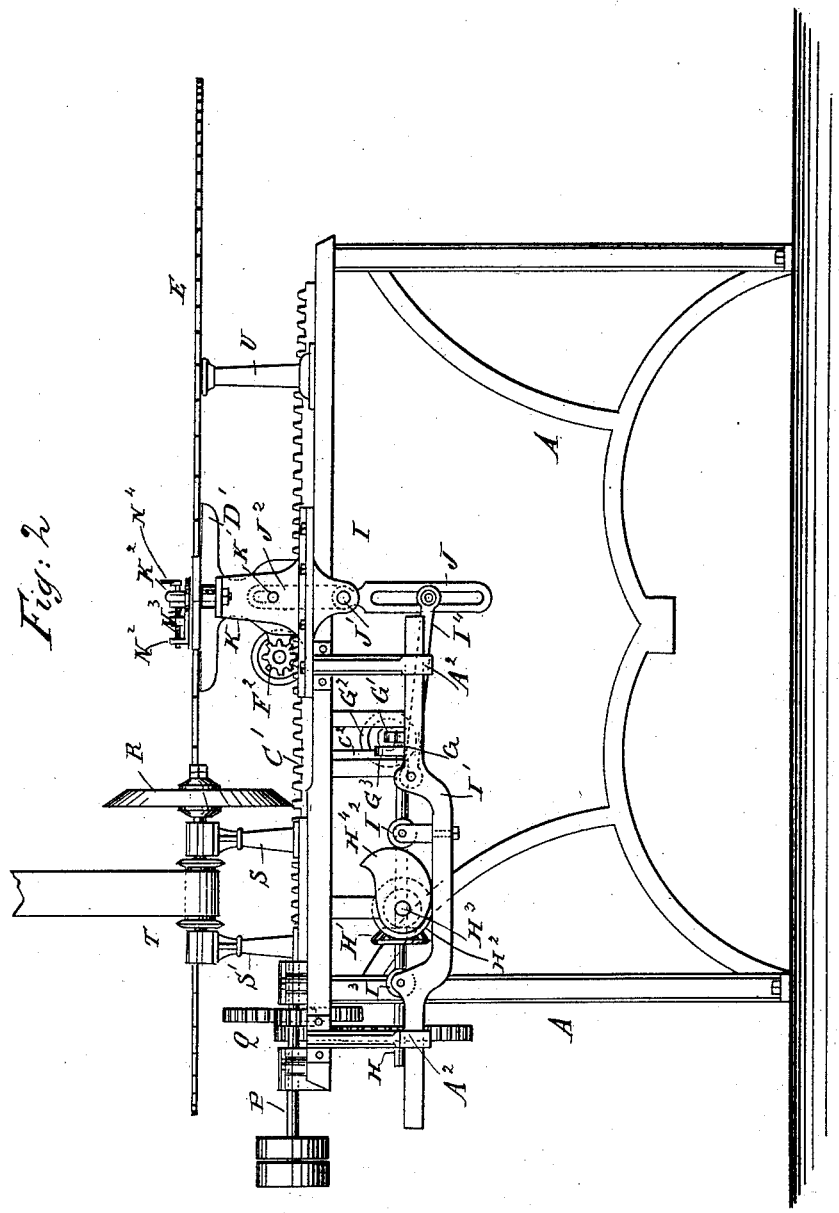

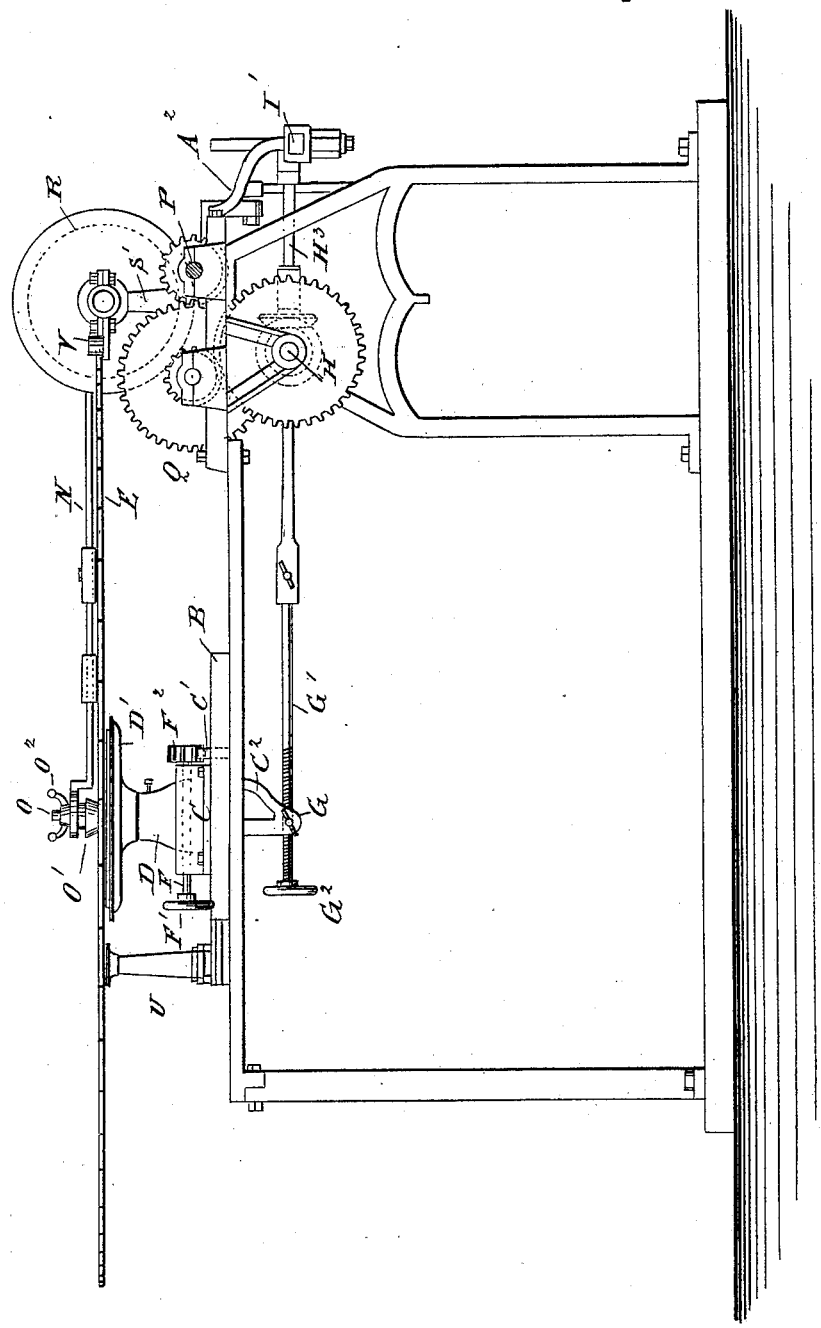

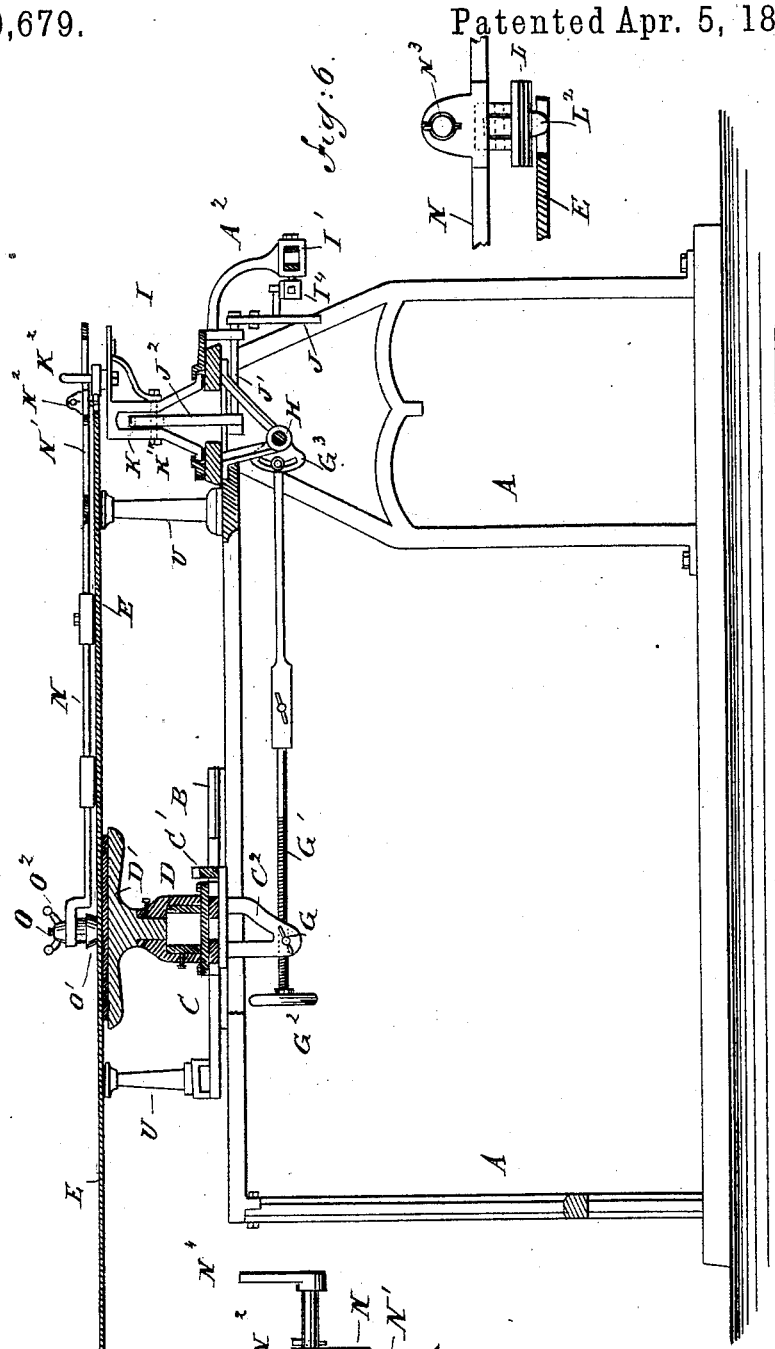

UNITED STATES PATENT OFFICE.

ROBERT GASKIN, OF FAIRVILLE, ASSIGNOR TO HIMSELF, AND GEORGE MEALEY, OF PORTLAND, NEW BRUNSWICK, CANADA.

ROTARY SAW-SHARPENER.

SPECIFICATION forming part of Letters Patent No. 360,679, dated April 5, 1887.

Application filed November 11, 1886. Serial No. 218,522. (No model.)

*To all whom it may concern:*

Be it known that I, ROBERT GASKIN, of Fairville, in the county of St. John, Province of New Brunswick and Dominion of Canada, have invented a new and Improved Rotary Saw-Sharpener, of which the following is a full, clear, and exact description.

The object of my invention is to provide a new and improved rotary saw-sharpener which is automatic and very effective in operation.

The invention consists of an adjustable saw-holder mounted on a sliding frame, means for imparting forward and backward motion to the said frame, a device for turning the saw automatically the distance of one tooth, and a stationary grinding-wheel.

The invention also consists of various parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a plan view of my improvement, parts of the saw being broken out. Fig. 2 is a front elevation of the same. Fig. 3 is an end elevation of the same. Fig. 4 is a sectional end elevation of the same on the line $x$ $x$ of Fig. 1. Fig. 5 is a front elevation of the device for moving the saw the distance of one tooth, and Fig. 6 is an end elevation of the same.

The frame A, of suitable construction, is provided with guide-plates B, on which travels the carriage C, supporting the movable holder D, provided with a socket, in which turns the saw-rest D', carrying the saw E. On the holder D is mounted the shaft F, provided on one end with a hand-wheel, F', and on its opposite end with a pinion, $F^2$, meshing into the rack C' of the carriage C. The holder D and its saw-rest D' can be moved longitudinally on the carriage C by turning the said hand-wheel F'.

In the middle of the carriage C are secured the downwardly-extending brackets $C^2$, between which is held a nut, G, in which screws the threaded rod G', carrying on one end the hand-wheel $G^2$, and connected by its other end with the slotted crank-arm $G^3$, secured to the shaft H, revolving in suitable bearings on the frame A. On the shaft H is secured the bevel gear-wheel H', meshing into the bevel gear-wheel $H^2$, fastened to the shaft $H^3$, carrying the cam $H^4$, which operates the device I for revolving the saw E the distance of one tooth at a time. This device I is provided with a bar, I', sliding longitudinally in suitable bearings $A^2$, attached to the main frame A; and the bar I' receives its motion from the cam $H^4$, which operates alternately on the friction-rollers $I^2$ and $I^3$, respectively mounted in suitable standards attached to the said bar I'. The said bar is connected by the link $I^4$ with the slotted arm J, attached to the shaft J', carrying the upwardly-extending arm $J^2$, having a slot, through which passes a stud, K', secured to the frame K, sliding longitudinally in suitable guides on the front of the frame A.

The frame K supports the pin $K^2$, which passes through a slot, N', in the adjustable arm or rod N, extending to the center of the saw E and carrying the bolt O, provided with the beveled collar O', which engages the central aperture of the saw E, and is held in place by the nut $O^2$, screwing on the threaded bolt O on the top of the rod or arm N. The arm or rod N is also provided with lugs $N^2$, which form a bearing for the screw-threaded rod $N^3$, having a handle, $N^4$, and carrying the sliding nut L', guided on the rod N, and provided on its lower end with the pawl L, pivoted on the said nut L', and having a wedge-shaped projection, $L^2$, on its under surface, which engages with the teeth of the saw E. The shaft H is rotated from the main shaft P by a suitable chain of gear-wheels, Q.

The grinding-wheel R is attached to a spindle mounted in suitable bearings on the standards S and S', erected on the main frame A, and the spindle carries the pulley T, which is connected by means of a belt with the driving machinery which is to operate the saw-grinder.

A roller, V, is mounted on an arm, V', adjustable on the standard S, and the said roller V is placed in close proximity to the back of the grinding-wheel R.

On the main frame A and on the carriage C are erected the standards U, which support the outer part of the saw E at several points.

The operation is as follows: A forward and backward motion is imparted to the carriage C, carrying the saw, by means of the crank-arm G³ on the revolving shaft H and the connecting-rod G'. The forward motion of the carriage C brings the front or cutting edge of one tooth of the saw in contact with the beveled rim of the grinding-wheel R, and the roller V forces the point of the tooth against the back of said wheel, whereby the point is sharpened. The carriage C, after the sharpening of the base of the tooth, recedes, so that the tooth leaves the grinding-wheel, and the device I now moves the saw the distance of one tooth by means of the pawl L, which travels upward with its frame K sliding on the frame A by the action of the cam H⁴, which moves the bar I' forward, and thereby causes a rocking of the shaft J' by means of the link I⁴; and the said shaft J' imparts the necessary motion to the frame K by means of the arm J² engaging the pin K'. The position of the cam H⁴ in relation to the crank-arm G³ is such that the frame K is only moved to the right after the carriage C commences to recede, and the frame K remains in a stationary position during the time that the grinding-wheel R is in contact with the tooth of the saw on the forward motion of the said carriage C.

When the carriage C recedes from the grinding-wheel, the carriage K moves toward the grinding-wheel, and thus keeps the back of the tooth against the beveled edge of the grinding-wheel. This motion of the frame K is continued until the point of the tooth is at about the center of the beveled edge of the grinding-wheel, when, on account of the peculiar form of the cam H⁴, the frame K remains stationary until the carriage C carries the saw out of contact. The frame K then suddenly starts toward the grinding-wheel again and pushes the point of the tooth of the saw past the edge of the grinding-wheel without touching it. As soon as the carriage C starts toward the grinding-wheel again, the frame K starts away from it and carries the pawl L back the distance of one tooth, ready to push the saw around again as soon as the carriage C commences to recede.

The pawl L, on account of being hinged to the nut L', is moved over the tooth on the return movement of the carriage K by the wedge-shaped projection L², and the pawl drops into the next space and engages with the cutting-edge of the tooth, as shown in Fig. 5.

The screw-threaded rod N³ permits of giving more or less feed to the saw while grinding by turning the handle N⁴.

The different parts are made adjustable, so as to accommodate saws of any diameter; and as the link I⁴ is adjustable in the slotted arm J, the necessary amount of throw for the frame K to move only one tooth can be readily obtained for different saws.

The position of the back of each saw-tooth in relation to the grinding-wheel R is regulated by causing the saw-holder D to slide on the carriage C by turning the hand-wheel F, so that the gear-wheel F², traveling on the rack C', causes a forward or backward movement of the said holder D.

Having thus fully described my invention, I claim as new and desire to secure by Letters Patent—

1. In a rotary saw-sharpener, the combination, with a revolving grinding-wheel mounted in stationary bearings, of a carriage having a forward and backward motion, an adjustable saw-holder mounted on the said carriage, and a frame sliding on the main frame and having connection with a rod or arm provided with lugs forming bearings for a screw having a sliding nut, and carrying a pawl which revolves the saw on its axis on the said holder the distance of one tooth, substantially as shown and described.

2. In a rotary saw-sharpener, the combination, with a revolving grinding-wheel mounted in stationary bearings, of a carriage having a forward and backward movement, a saw-holder mounted to slide on the said carriage, means for moving the said saw-holder longitudinally on the carriage, a frame sliding on the main frame and having connection with a rod or arm provided with lugs forming bearings for a screw having a sliding nut, and carrying a pawl which engages the teeth of the saw, and means for imparting a longitudinal movement to the said frame carrying the pawl, substantially as shown and described.

3. In a rotary saw-sharpener, the revolving shaft H, the slotted crank-disk G³, and the adjustable screw-threaded rod G', in combination with the carriage C, adapted to slide on the main frame, the nut G, in which screws the said rod G', and which is held in brackets on the said carriage C, and the adjustable saw-holder D, mounted to slide on the said carriage C, substantially as shown and described.

4. In a rotary saw-sharpener, the carriage C, having a forward and backward movement, and the rack C' on the said carriage, in combination with the saw-holder D, mounted to slide on the said carriage C and carrying the shaft F, provided with the hand-wheel F' and mounted to turn in the said saw-holder D, and the pinion F² on the said shaft F, and meshing into the rack C', substantially as shown and described.

5. In a rotary saw-sharpener, the carriage C, the adjustable rod G', the slotted crank-arm G³, and the shaft H, carrying the bevel gear-wheel H', in combination with the shaft H³, carrying the bevel gear-wheel H², meshing in the said gear-wheel H', the cam H⁴, secured to the said shaft H³, the sliding bar I', operated by the said cam H⁴, the link I⁴, pivotally connected with the said bar I', the slotted arm J, in which one end of the said link I⁴ is adjustable, the rocking shaft J', to which the said arm J is fastened, the arm J² on the said shaft J', and the frame K, having connection by a pin, K², with rod or arm N, provided with lugs N² N², forming bearings for a screw, N³, having a sliding nut, L′, and carrying the pawl L, and connected by the pin K′ with the said arm J², substantially as shown and described.

6. In a rotary saw-sharpener, the frame K, sliding on the main frame A, the pin K², attached on the said frame K, and the pawl L, in combination with the adjustable rod N, having the slot N′, and lugs N², forming bearings for a screw, N³, carrying a nut, L′, to which is pivoted the said pawl, the bolt O, held on the said rod N, and provided with the beveled collar O′, engaging the central aperture of the saw, and the nut O², screwing on the said bolt, substantially as shown and described.

ROBERT GASKIN.

Witnesses:
JNO. L. CARLETON,
A. B. WALKER.